Aug. 27, 1957     A. R. CHASAR     2,804,174
LIFT TRUCK
Filed April 1, 1955     2 Sheets-Sheet 2
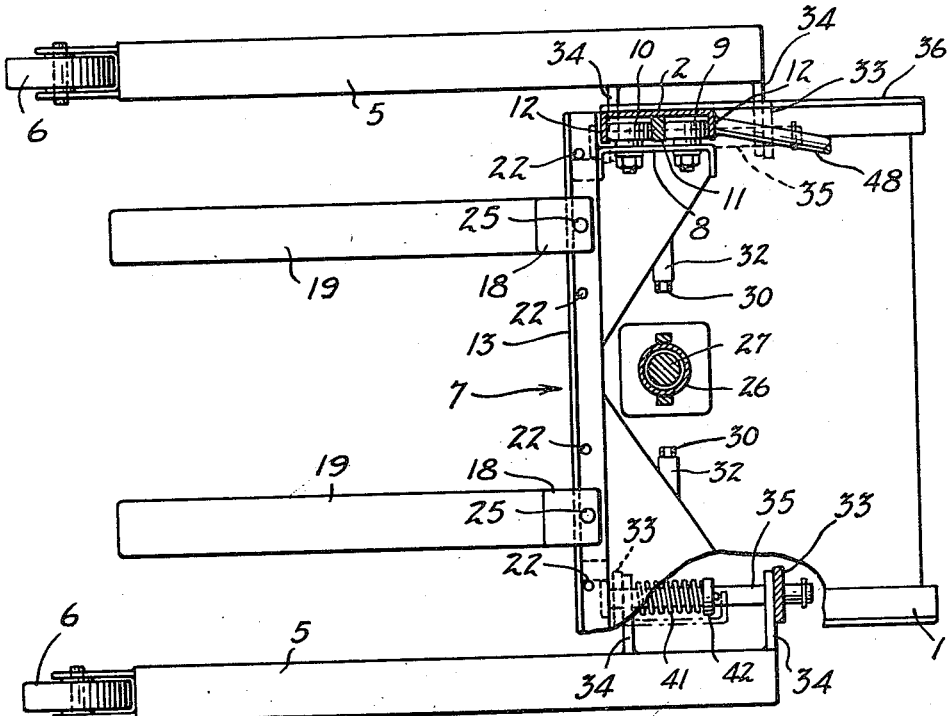
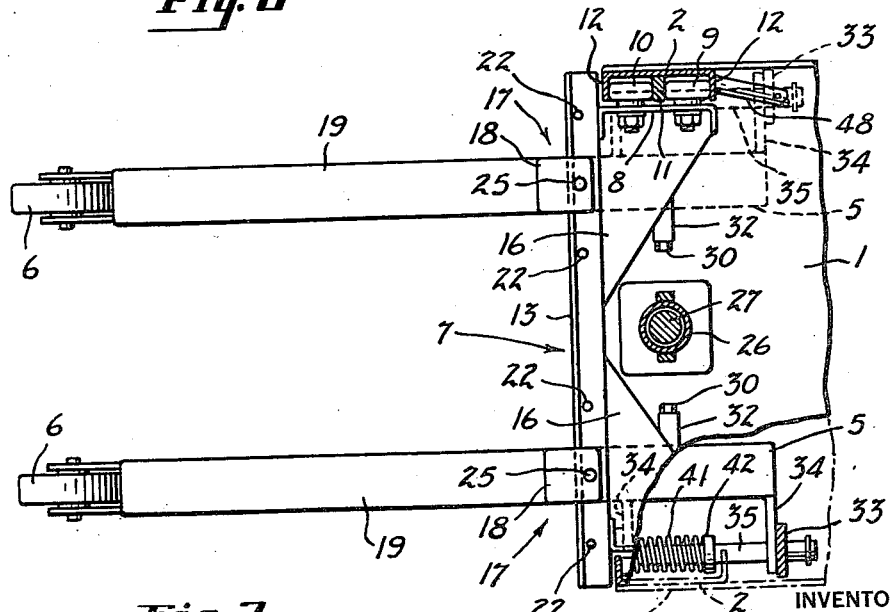
INVENTOR
Anthony R. Chasar
BY Evans + McCoy
ATTORNEYS

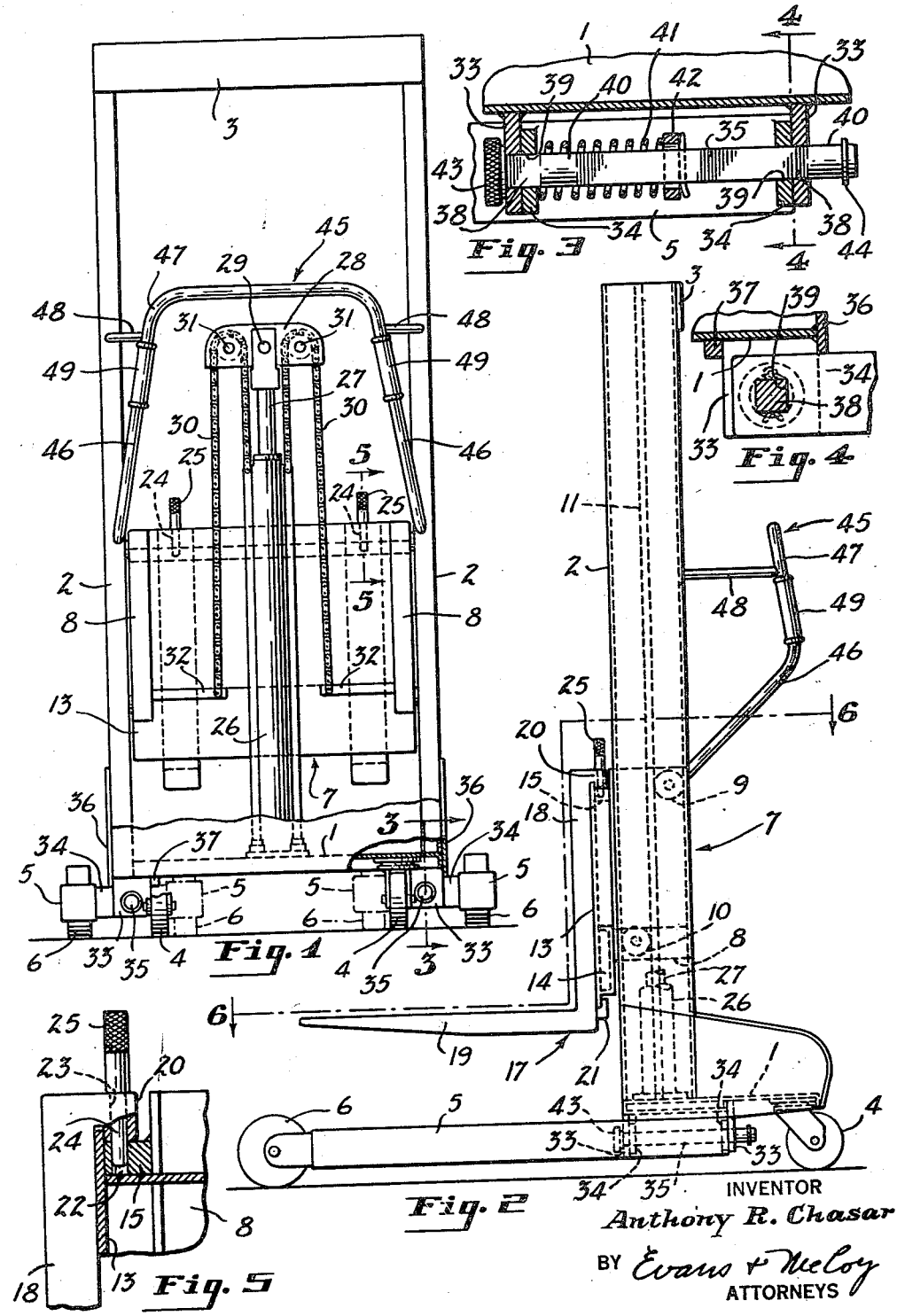

United States Patent Office 2,804,174
Patented Aug. 27, 1957

2,804,174

LIFT TRUCK

Anthony R. Chasar, Cleveland, Ohio, assignor to The Oster Manufacturing Company, Cleveland, Ohio, a corporation of Ohio Application April 1, 1955, Serial No. 498,616

3 Claims. (Cl. 187—9)

This invention relates to lift trucks of the type having a vertically movable load lifting carriage and particularly to trucks for handling loads carried on pallets or skids.

The truck of the present invention is provided with a base frame which supports two laterally spaced guide standards upon which a load receiving carriage is mounted for vertical travel. The base frame has supporting wheels disposed rearwardly of the guide standards and a pair of outrigger arms are rigidly connected to the base frame and extend forwardly therefrom. The forwardly extending frame arms have supporting wheels adjacent their forward ends and are disposed in parallel relation on opposite sides of the longitudinal center line of the truck. Each of the forwardly extending frame arms is mounted for adjustment bodily toward or away from the longitudinal center line of the truck so that the space between the arms may be widened or narrowed. The load receiving carriage has a load carrying portion that extends forwardly from its lower portion and that is adapted to be lowered below the tops of the outrigger frame arms. The load carrying portion of the carriage may be positioned between the frame arms and the frame arms may be adjusted to a narrow space so that they can enter beneath a pallet with the load carrying portion of the carriage or they may be adjusted to a wide spacing to straddle a skid.

The load carrying portion of the carriage is preferably of the fork type composing two laterally spaced load carrying members that are attached to the carriage, each having a forwardly extending arm at the lower end thereof. The load carrying members are preferably each laterally adjustable on the carriage so that the spacing of the supporting arms may be increased or decreased. By providing adjustable frame arms and adjustable load carrying arms the load carrying arms may be placed between the frame arms or the frame arms may be placed between the fork arms.

Objects of the invention are to provide a lift truck suitable for handling either skids or pallets and to provide a load carrying member of adjustable width.

Reference should be had to the accompanying drawings forming part of this specification in which:

Figure 1 is a rear elevation of a lift truck embodying the invention;

Fig. 2 is a side elevation of the truck;

Fig. 3 is a fragmentary vertical section taken on the line indicated at 3—3 in Fig. 1, showing the hinge connection for the frame arms;

Fig. 4 is a vertical section taken on the line indicated at 4—4 in Fig. 3;

Fig. 5 is a fragmentary vertical section taken on the line indicated at 5—5 in Fig. 1;

Fig. 6 is a top plan view of the truck with the outrigger frame arms in their most widely spaced positions; and Fig. 7 is a plan view of the truck showing the outrigger frame arms in their innermost positions and the fork arms adjusted to their outermost positions where they are disposed outside the frame arms.

Referring to the accompanying drawings the truck of the present invention is provided with a base frame 1 to which laterally spaced upright guide members 2 are rigidly attached. The guide members 2 are channel shaped in cross section and are connected at their upper ends by a cross bar 3. The base frame 1 has a pair of caster wheels 4 that are disposed rearwardly of the standards 2 and a stable support for the standards 2 is provided by outrigger arms 5 that extend forwardly from the base frame 1 at opposite sides thereof. The arms 5 extend horizontally and on opposite sides of the longitudinal center line of the truck, the forward ends of the arms 5 carrying supporting wheels 6 at a distance from the standards 2, considerably greater than that of the caster wheels 4.

A load receiving carriage 7 is mounted for vertical travel between the standards 2 and this carriage has vertically disposed side bars 8 which are disposed adjacent the inner sides of the guide standards 2. The side bars 8 carry upper and lower rollers 9 and 10 which are guided for vertical travel in the standards 2. The upper rollers 9 are offset rearwardly with respect to the roller 10 and the rollers 9 and 10 engage with a central guide rib 11 that is welded to the webs of the channel shaped guide standards 2 centrally thereof. The rollers 9 and 10 travel in vertical channels that are formed between the central rib 11 and the rear and front flanges 12 of the standards 2. The side bars 8 of the carriage are connected by a vertical front plate 13 that is attached adjacent its bottom and top edges to horizontally disposed cross bars 14 and 15 secured to the front flanges of the side bars 8. Suitable braces such as gusset plates 16 are interposed between the side bars 8 and the plate 13. The carriage 7 supports two L-shaped load carrying members 17 each of which has a vertical attaching arm 18 that engages the front face of the plate 13 and a forwardly projecting load carrying arm 19. The spaced arms 19 provide a load lifting fork and are positioned below the tops of the frame arms 5 in the lowermost position of the carriage 7.

The load carrying members 17 are preferably mounted for lateral adjustment on the carriage 7 so that the width of the load lifting fork may be increased or decreased. The vertical arms 18 of the load carrying members have upper and lower guide lugs 20 and 21 that slide on the top and bottom edges of the plate 13. As shown in Fig. 5, the upper guide lugs 20 slidably engage the top face of the crossbar 15 which is disposed a short distance below the top edge of the plate 13. The crossbar 15 has spaced vertically disposed apertures 22 and each of the guide lugs 20 is provided with a vertical aperture 23 that is adapted to register with the apertures 22 of the crossbar. Locking pins 24 are provided for securing the load carrying members 17 in adjusted positions, the pins 24 being provided with handles 25 at their upper ends so that they can be quickly and easily inserted into or removed from the apertures 22 and 23.

A vertically disposed hydraulic cylinder 26 is mounted on the base frame 1 midway between the guide standards 2 and is provided with a vertically movable piston 27, to the upper end of which an equalizer bar 28 is connected by means of a horizontal pivot 29. An actuating connection between the piston and the carriage 7 is provided by hoist chains 30 that are attached to the upper ends of the cylinder 26 on opposite sides of the piston 27, the chains 30 extending upwardly from the cylinder 26 over guide sheaves 31 mounted on opposite ends of the equalizer bar 28 and downwardly to their point of attachment to the carriage 7, the carriage 7 being provided with arms 32 rigidly attached to the side bars 8 and connected at their inner ends to the chains 30.

To facilitate lateral adjustment of the outrigger frame arms 5, the two arms 5 are provided with identical hinge connections to the base frame 1. To provide these connections the base frame 1 has longitudinally spaced vertically disposed hinge plates 33 rigidly attached thereto and projecting downwardly therefrom adjacent each side thereof. Each of the arms 5 has two hinge plates 34 that project laterally therefrom and that are spaced apart a distance such that they are adapted to engage with the hinge plates 33. A horizontal pintle 35 extends through the plates 33 and 34 to complete the hinge connection. The pintles 35 are disposed parallel to the arms 5 and the hinge plates are so disposed that each of the arms 5 can be swung about the axis of its pintle 35 from a position inwardly of the pintle as shown in Fig. 7 to a position outwardly of the pintle as shown in Fig. 6. In the outermost position of the arms 5, the top edges of the hinge plates 34 engage the bottom edge of a stop plate 36 as shown in Fig. 4 and, when swung inwardly, the plates 34 engage with a stop bar 37 attached to the underside of the frame 1, the stop members 36 and 37 serving to transmit the weight of the truck to the arms 5 and to limit the swinging movement of the arms from a position between the pintles 35 to a position outwardly thereof. As shown in Fig. 2 of the drawings, the front supporting wheel 6 projects slightly above and below the top and bottom faces of the arms 5 so that the arms 5 are supported above the floor in each position of adjustment.

In order to avoid play between the bars 5 and frame 1, means is preferably provided for locking the arms 5 against movement relative to the frame 1 in each position of adjustment. To provide this lock, the pintle 35 is provided with spaced polygonal portions 38 that are adapted to fit in polygonal openings 39 in the hinge plates 33 and 34, and have round portions 40 that are adapted to be moved into the openings 39 upon an axial movement of the pin 35. Each pin 35 is normally held in its locking position by means of a coil spring 41 surrounding the pin and interposed between one of the plates 34 and a collar 42 on the pin. The forward end of each of the pintles has a knurled head 43 by means of which it can be grasped and pulled forwardly in opposition to the spring 41 to move the polygonal locking portions of the pin out of engagement with plates 33 and 34 and to dispose round portions 40 of the pin in the openings 39 of the plates to permit pivotal movement. A collar 44 is provided on the rear end of each of the pins 35 to limit forward movement of the pin and to prevent removal thereof.

The adjustment of the load carrying members 17 to the desired spacing can be effected by moving the carriage 7 to a position where the fork arms 19 are above the frame arms 5 and sliding each of the arms 19 to the desired position of adjustment after it is released by removal of its locking pin 24. After the load carrying member has been moved to the desired position of adjustment, the locking pin is again inserted.

To adjust the outrigger frame arms 5, the truck is tilted laterally to lift one side clear of the floor after which the hinge pin of the arm lifted clear of the floor is moved to releasing position, permitting the arm to be swung about the pivot from one side of the pivot to the other.

In handling loads carried by pallets, it is usually advantageous to position the arms 5 in their outermost positions so that they will straddle the pallet and to position the fork arms 19 between the arms 5 as shown in Fig. 6. For handling skids, it is usually advantageous to adjust the arms 5 to their innermost positions as shown in Fig. 7 so that both the arms 5 and the arms 19 may be inserted beneath the load.

As herein illustrated, the lift truck is of the hand propelled type, being provided with a push bar 45 that has downwardly extending ends attached to the standards 2, the lower portions 46 of which extend upwardly and rearwardly from the standards and the upper portions 47 of which are substantially vertical. The upright portions 47 of the push bar are connected to the standards 2 by brace bars 48 and may be provided with hand grips 49 which facilitate the steering of the truck and also the tilting of the empty truck for adjustment of the frame arms 5.

It is to be understood that in accordance with the provisions of the patent statutes, variations and modifications of specific devices herein shown and described may be made without departing from the spirit of the invention.

What I claim is:

1. A lift truck comprising a frame having a rear cross member and outrigger arms extending forwardly from opposite ends of said cross member, a hinge connection between each of said arms and said cross member comprising a hinge bracket underlying said cross member and attached thereto, a hinge arm extending laterally from the rear end of the outrigger arm and a pintle connecting the hinge arm to the bracket, said pintle being disposed substantially parallel to the outrigger arm, said hinge connection permitting each outrigger arm to be swung from an adjusted position inwardly of its hinge pintle to another position of adjustment outwardly of its hinge pintle, means for limiting the swinging movements of said arms in each direction, a supporting wheel carried by said cross members, a supporting wheel carried by each of said frame arms adjacent its forward end, each of said wheels being mounted on an axle intermediate the top and bottom faces of its frame arm and having peripheral portions projecting past the planes of the top and bottom faces of said arm for engagement with a floor surface in either adjusted position of the arm, and a vertically movable elevator carriage mounted on said frame having forwardly extending load supporting portions movable from a load receiving position below said cross member to a load carrying position above the same.

2. A lift truck comprising a pair of laterally spaced standards, a base member connecting the inner ends of said standards, supporting wheels carried by said base member rearwardly of said standards, outrigger arms extending forwardly from said base member at opposite ends thereof, a hinge connection between each of said arms and said base member comprising spaced front and rear hinge arms on the under side of said base member, front and rear hinge arms attached to an arm and projecting laterally therefrom and engaging said first-mentioned hinge arms and a hinge pintle parallel to said outrigger arms and extending through said hinge arms, said hinge connection permitting said outrigger arms to swing from positions outwardly of said pintles to positions between said pintles, said pintles being slidable in said hinge arms and having polygonal locking portions movable into and out of polygonal openings in certain of said arms to lock said outrigger arms in adjusted positions and round portions movable into said polygonal openings to permit swinging of said arms from one of their adjusted positions to the other, an elevator carriage mounted for movement up and down on said guide members, load carrying means on said carriage projecting forwardly therefrom, and supporting wheels on the forward end of said outrigger arms that are positioned to engage the floor in either position of adjustment of said arms.

3. A lift truck comprising a frame having a base, a pair of upright laterally spaced guide members mounted on said base and supporting wheels rearwardly of said guide members, an elevator carriage mounted to travel up and down on said guide members, means for actuating said carriage, a pair of load carrying members attached to said carriage, one on each side of the longitudinal center line of said truck, each of said members having a load supporting arm below the lower end of said carriage and extending forwardly and horizontally therefrom substantially parallel to said center line, said arms being movable with said carriage down to and up from a load receiving position adjacent the surface on which the truck travels, a pair of laterally spaced outrigger arms extending forwardly from said base on opposite sides of said center line and substantially parallel thereto, a supporting wheel adjacent the forward end of each of said outrigger arms, and means for rigidly attaching said outrigger arms to said base in different positions of lateral adjustment, in one of which they are farther apart than said load supporting arms and straddle the same when said load supporting arms are in load receiving position and in another of which they are beneath said carriage and closer together than said load supporting arms, in which position said outrigger arms are straddled by said load supporting arms when said load supporting arms are in their load receiving position.

References Cited in the file of this patent

UNITED STATES PATENTS

| | | |
|---|---|---|
| 2,421,472 | Way | June 3, 1947 |
| 2,678,746 | Gibson | May 18, 1954 |